United States Patent
Liu et al.

(10) Patent No.: US 11,279,822 B2
(45) Date of Patent: Mar. 22, 2022

(54) EPOXY RESIN WAVE-ABSORBING COMPOSITE MATERIAL AND PREPARATION METHOD THEREOF

(71) Applicants: LUOYANG INSTITUTE OF CUTTING-EDGE TECHNOLOGY, Henan (CN); LUOYANG INSTITUTE OF CUTTING-EDGE TECHNOLOGY LTD, Henan (CN)

(72) Inventors: Ruopeng Liu, Shenzhen (CN); Zhiya Zhao, Shenzhen (CN); Miao Yin, Shenzhen (CN); Lu Zhang, Shenzhen (CN); Yan Hou, Shenzhen (CN); Yunxiang Zhang, Shenzhen (CN); Zhonghao Qiu, Shenzhen (CN); Xue Li, Shenzhen (CN)

(73) Assignees: LUOYANG INSTITUTE OF CUTTING-EDGE TECHNOLOGY, Henan (CN); LUOYANG CUTTING EDGE EQUIPMENT TECHNOLOGY LTD, Henan (CN)

(*) Notice: Subject to any disclaimer, the term of this patent is extended or adjusted under 35 U.S.C. 154(b) by 148 days.

(21) Appl. No.: 16/695,352

(22) Filed: Nov. 26, 2019

(65) Prior Publication Data
US 2020/0095419 A1 Mar. 26, 2020

Related U.S. Application Data

(63) Continuation of application No. PCT/CN2018/083677, filed on Apr. 19, 2018.

(30) Foreign Application Priority Data

May 26, 2017 (CN) .......................... 201710386665.4

(51) Int. Cl.
*C08L 63/00* (2006.01)
*C08G 59/50* (2006.01)
(Continued)

(52) U.S. Cl.
CPC ............ *C08L 63/00* (2013.01); *C08G 59/504* (2013.01); *C08G 59/5006* (2013.01); *C08K 9/06* (2013.01); *C08K 3/04* (2013.01); *C08K 3/40* (2013.01)

(58) Field of Classification Search
None
See application file for complete search history.

(56) References Cited

U.S. PATENT DOCUMENTS

| 5,879,794 A * | 3/1999 | Korleski, Jr. ............. B32B 5/28 428/317.1 |
| 2003/0107026 A1* | 6/2003 | Fujiki ...................... C08K 9/02 252/500 |

(Continued)

FOREIGN PATENT DOCUMENTS

| CN | 102807801 A | 12/2012 |
| CN | 103290396 A | 9/2013 |

(Continued)

OTHER PUBLICATIONS

"Epoxy Group Functional Silane CAS No. 2830-83-8 (A-187)" Made-in-China, https://ahelite.en.made-in-china.com/product/SXYmyPDCZEUs/China-Epoxy-Group-Functional-Silane-CAS-No-2830-83-8-A-187-.html. Accessed Nov. 2, 2021 (Year: 2021).*

(Continued)

*Primary Examiner* — Megan McCulley
(74) *Attorney, Agent, or Firm* — Cantor Colburn LLP

(57) ABSTRACT

The present disclosure provides an epoxy resin wave-absorbing composite material and a preparation method thereof. The method includes: heating an epoxy resin to 50°

(Continued)

C.~70° C., and adding carbon black, to obtain a mixture of the epoxy resin and the carbon black; heating the mixture of the epoxy resin and the carbon black to 100° C.~120° C., adding a curing agent, and stirring and dissolving them to obtain a mixture of the epoxy resin, the carbon black, and the curing agent; and adding surface-treated hollow glass microbeads into the mixture of the epoxy resin, the carbon black, and the curing agent, and curing them to obtain the epoxy resin wave-absorbing composite material.

14 Claims, 2 Drawing Sheets

(51) Int. Cl.
*C08K 9/06* (2006.01)
*C08K 3/04* (2006.01)
*C08K 3/40* (2006.01)

(56) References Cited

U.S. PATENT DOCUMENTS

| | | | | |
|---|---|---|---|---|
| 2005/0070658 | A1* | 3/2005 | Ghosh | F25D 21/08 |
| | | | | 524/495 |
| 2008/0295955 | A1* | 12/2008 | Cawse | B32B 27/12 |
| | | | | 156/276 |
| 2008/0311373 | A1 | 12/2008 | Hsu | |
| 2009/0030134 | A1* | 1/2009 | Sasaki | H05K 1/0373 |
| | | | | 524/493 |
| 2010/0152326 | A1* | 6/2010 | Kurz | C08J 3/2053 |
| | | | | 523/339 |
| 2010/0222487 | A1* | 9/2010 | Nishi | C01B 33/18 |
| | | | | 524/493 |
| 2011/0281964 | A1* | 11/2011 | Zmarsly | B29B 7/487 |
| | | | | 521/60 |
| 2013/0210303 | A1* | 8/2013 | Doi | B32B 27/32 |
| | | | | 442/67 |
| 2015/0210039 | A1* | 7/2015 | Simmons | B82Y 30/00 |
| | | | | 428/172 |
| 2015/0232998 | A1* | 8/2015 | Colominas Tutusaus | |
| | | | | C09D 7/48 |
| | | | | 428/313.9 |
| 2016/0310924 | A1* | 10/2016 | Nakatomi | H01M 4/0404 |
| 2017/0015847 | A1* | 1/2017 | Duncan | C09C 3/08 |
| 2017/0088664 | A1* | 3/2017 | Elgimiabi | C08G 59/5026 |
| 2018/0362811 | A1* | 12/2018 | Waid | C09J 7/38 |
| 2019/0352495 | A1* | 11/2019 | Kato | C08K 5/3475 |
| 2021/0062054 | A1* | 3/2021 | Koch | C09J 163/00 |

FOREIGN PATENT DOCUMENTS

| | | |
|---|---|---|
| CN | 104479521 A | 4/2015 |
| CN | 106498757 A | 3/2017 |
| TW | 469283 B | 12/2001 |

OTHER PUBLICATIONS

"Silane Coupling Agent A-172" ChemBK, https://www.chembk.com/en/chem/Silane%20Coupling%20Agent%20A-172 Accessed Nov. 2, 2021 (Year: 2021).*

"Silquest A-1100", Knowde, https://www.knowde.com/stores/momentive-performance-materials/products/silquest-a-1100/ Accessed Nov. 2, 2021 (Year: 2021).*

International Search Report for corresponding application PCT/CN2018/083677 filed Apr. 19, 2018; dated Jul. 2, 2018.

Baizhan Zheng, "Research on preparation and properties of hollow glass bead filled epoxy composites", Science and Technology, Thermosetting Resin, Mar. 31, 2009, vol. 24, No. 2.

European Search Report for corresponding application EP 18806757; Report dated Oct. 27, 2020.

* cited by examiner

EPOXY RESIN WAVE-ABSORBING COMPOSITE MATERIAL AND PREPARATION METHOD THEREOF

TECHNICAL FIELD

The present disclosure relates to the field of materials, and more particularly to an epoxy resin wave-absorbing composite material and a preparation method thereof.

BACKGROUND

Along with the progress of science and technology, the application of electronic and information technologies has developed rapidly. The rapid spread of various modern electronic devices, such as radio, television, mobile phone, etc., has led to more electronic and electrical equipments successively entering the daily office and living environment, which causes electromagnetic radiation pollution seriously affecting people's health. Therefore, the requirement for electromagnetic shielding of wave-absorbing composite materials is increased day by day.

In addition, in the applications of aerospace, building materials, vehicles, and weapons, etc., wave-absorbing composite materials often needs to reduce material density and costs as much as possible while maintaining the performance of composite materials.

However, the main disadvantages of traditional wave-absorbing composite materials (such as ferrite, graphite, ceramics, etc) are high density, narrow wave-absorbing bandwidth, etc., which cannot meet the requirements, such as thin, light, wide, and strong, of the wave-absorbing materials.

SUMMARY

In the present disclosure, epoxy resin is used as a base, and carbon black with superb electromagnetic shielding performance and surface-treated hollow glass microbeads are used as a wave-absorbing agent, so that the composite material has good electromagnetic shielding performance. In addition, applying the surface-treated hollow glass microbeads to the wave-absorbing agent can not only reduce material density but also implement strong absorption of electromagnetic waves within a relatively wide band. In addition, using a silane coupling agent to process hollow glass microbeads facilitates even dispersion of the hollow glass microbeads in the epoxy resin base, so that a good surface conjunction can be formed between the epoxy resin and the hollow glass microbeads. This effectively overcomes disadvantages, such as high density and a narrow wave-absorbing band, of conventional wave-absorbing composite materials.

The present disclosure provides a preparation method of an epoxy resin wave-absorbing composite material, comprising:

heating an epoxy resin to temperature T1 and adding carbon black to obtain a mixture of the epoxy resin and the carbon black;

heating the mixture of the epoxy resin and the carbon black to temperature T2, adding a curing agent, and stirring and dissolving them to obtain a mixture of the epoxy resin, the carbon black, and the curing agent; and adding surface-treated hollow glass microbeads into the mixture of the epoxy resin, the carbon black, and the curing agent, and curing them to obtain the epoxy resin wave-absorbing composite material.

The present disclosure further provides an epoxy resin wave-absorbing composite material prepared according to the foregoing preparation method.

According to the epoxy resin wave-absorbing composite material preparation method provided in the present disclosure, the carbon black and the surface-treated hollow glass microbeads are used as the wave-absorbing agent, so that the composite material has good electromagnetic shielding performance, and density of the composite material is reduced to a minimum of 0.85 g/cm$^3$. Further, the steps such as ultrasonically dispersing and vacuum degassing are performed, so that the surface-treated hollow glass microbeads are fully mixed with the mixture of the epoxy resin, the carbon black, and the curing agent. Then vacuum curing is performed, so that the prepared epoxy resin wave-absorbing composite material implements strong absorption at a wide band of 0.5 to 18 GHz, with a reflectivity less than to 5 dB. This effectively overcomes disadvantages, such as high density and a narrow wave-absorbing band, of conventional wave-absorbing composite materials.

DESCRIPTION OF EMBODIMENTS

Figure 1:
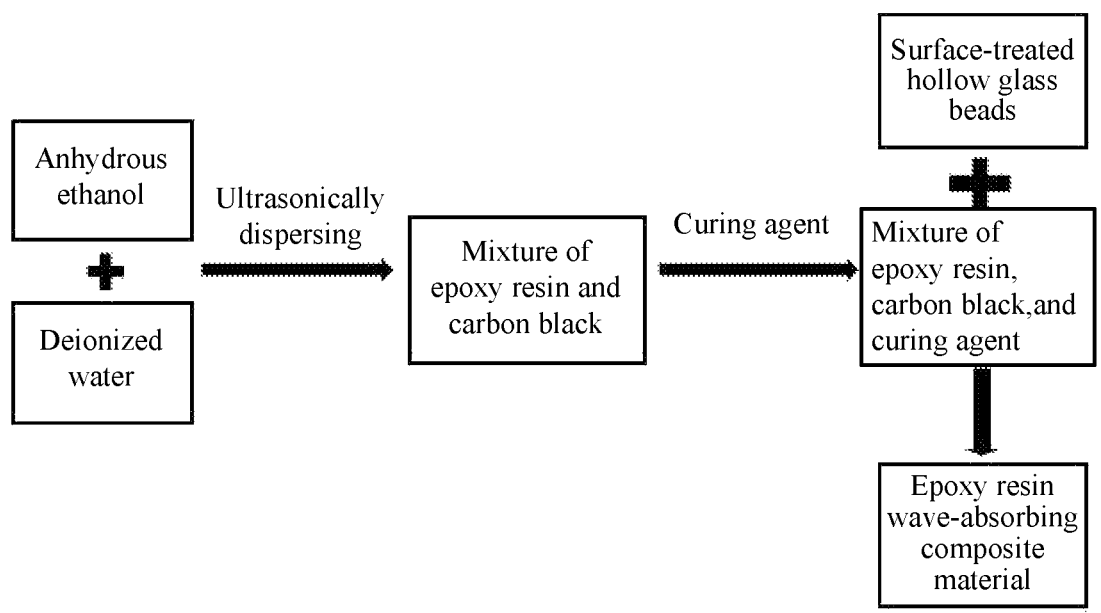
FIG. 1 is a schematic view showing a preparation process of an epoxy resin wave-absorbing composite material.

The following embodiments help a person skilled in the art better understand the present disclosure, but constitute no limitation on the present disclosure in any manner.

In the present disclosure, an epoxy resin is used as the substrate, carbon black having better performance of electromagnetic shielding and surface-treated hollow glass microbeads are used as the wave-absorbing agent, so as to obtain the wave-absorbing material having small density, wide wave-absorbing bandwidth, and high strength, the specific steps are described as follows:

Surface treatment of hollow glass microbeads: mixing anhydrous ethanol and deionized water that have a mass ratio of 8 to 10:0.5 to 2, to prepare an ethanol-water mixed solution. Adding glacial acetic acid into the ethanol-water mixed solution to adjust pH to 3 to 4; then adding a silane coupling agent into them to prepare a silane coupling agent solution having a mass fraction of 2% to 3%; and further adding the hollow glass microbeads into the silane coupling agent solution to prepare a hollow glass microbeads solution having a mass fraction of 5% to 15%.

Then the hollow glass microbeads solution is heated to 80° C. to 100° C., stirred for 60 to 80 minutes, filtered by using a polypropylene microporous membrane, washed by using deionized water until the solution is neutral; and then dried at 100° C. to 110° C. for 2 to 3 hours under vacuum circumstance to obtain surface-treated hollow glass microbeads. Wherein the silane coupling agent is one or more of A-1100, A-187, and A-172.

Preparation of epoxy resin wave-absorbing composite material: heating epoxy resin to 50° C. to 70° C., adding carbon black, and then ultrasonically dispersing them for 30 to 60 minutes; to obtain a mixture of the epoxy resin and the carbon black. Heating the mixture of the epoxy resin and the carbon black to 100° C. to 120° C., adding a curing agent, stirring and dissolving them to obtain a mixture of the epoxy resin, the carbon black, and the curing agent.

Adding the surface-treated hollow glass microbeads into the mixture of the epoxy resin, the carbon black, and the curing agent; then ultrasonically dispersing them for 30 to 60 minutes, and further degassing them by using a vacuum oven or a vacuum degasser until the mixture has no bubble.

Then the mixture of the epoxy resin, the carbon black, and the curing agent is poured into a mold, dried at 110° C. to 130° C. for 1 to 3 hours and cured at 170° C. to 190° C. for 3 to 5 hours under vacuum circumstance; to obtain an epoxy resin wave-absorbing composite material.

Wherein the mass ratio of the epoxy resin, the carbon black, the curing agent, and the surface-treated hollow glass microbeads is 80 to 120:20 to 30:30 to 34:25 to 35, preferably 100:25:32:30, and the curing agent is one or more of 4,4'-diaminodiphenyl sulfone (DDS), dipropylenetriamine (DPTA), and trimethylethylenediamine.

Embodiment 1

Surface treatment of hollow glass microbeads: mixing anhydrous ethanol and deionized water that have a mass ratio of 9:1 to prepare an ethanol-water mixed solution. Adding glacial acetic acid into the ethanol-water mixed solution to adjust pH to 3 to 4; then adding a silane coupling agent A-1100 into them to obtain a silane coupling agent solution having a mass fraction of 2.5%; and further adding the hollow glass microbeads into the silane coupling agent solution to obtain a hollow glass microbeads solution.

Then the hollow glass microbeads solution is heated to 90° C., stirred for 60 minutes, filtered, washed by using deionized water until the solution is neutral, and then dried at 105° C. for 2 hours under vacuum circumstance, to obtain surface-treated hollow glass microbeads.

Preparation of epoxy resin wave-absorbing composite material: heating 120 portions of epoxy resin to 60° C., adding 20 portions of carbon black, and then ultrasonically dispersing them for 30 minutes, to obtain a mixture of the epoxy resin and the carbon black. Heating the mixture of the epoxy resin and the carbon black to 110° C., adding 34 portions of curing agent, stirring and dissolving them to obtain a mixture of the epoxy resin, the carbon black, and the curing agent. Adding 30 portions of surface-treated hollow glass microbeads into the mixture of the epoxy resin, the carbon black, and the curing agent; then ultrasonically dispersing them for 30 minutes, and further degassing them by using a vacuum oven until the mixture has no bubble.

Figure 2:
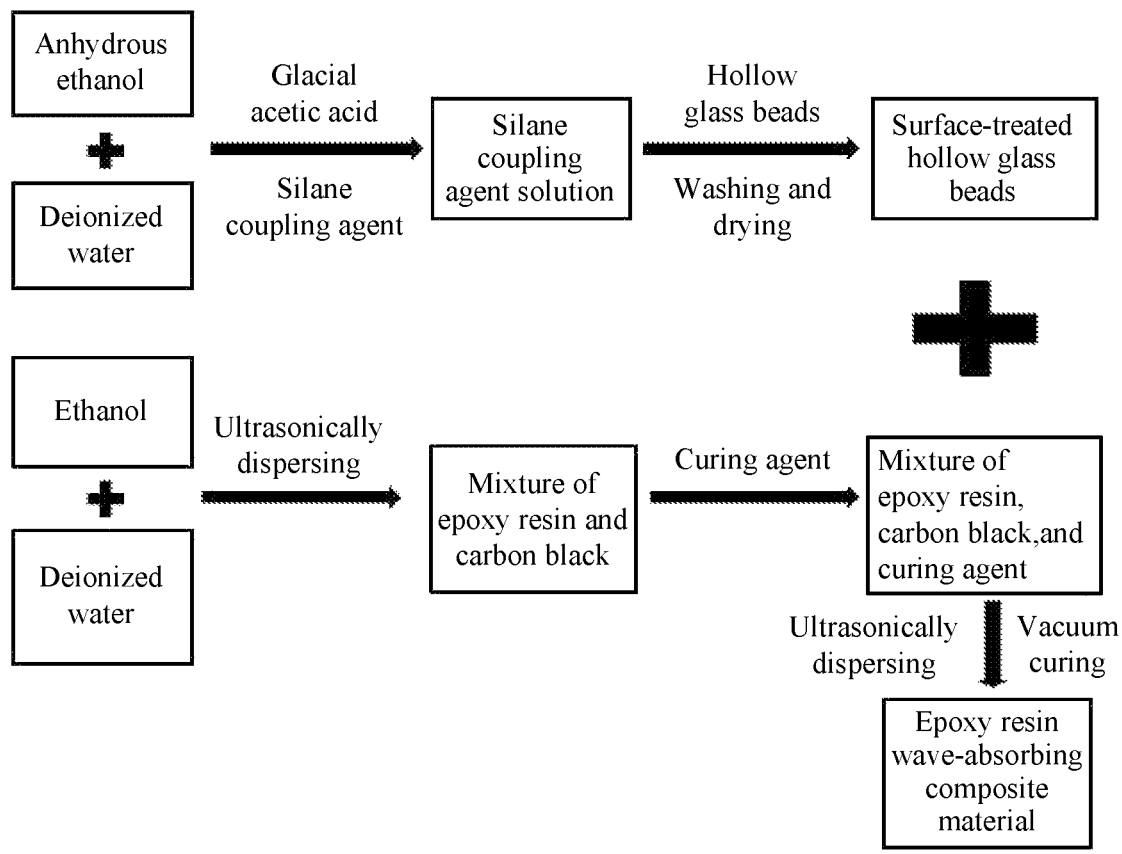
FIG. 2 is a schematic view showing a preparation process of an epoxy resin wave-absorbing composite material according to Embodiment 1.

Then the mixture of the epoxy resin, the carbon black, and the curing agent is poured into a mold, dried at 120° C. for 2 hours and cured at 180° C. for 4 hours under vacuum circumstance, to obtain the epoxy resin wave-absorbing composite material. Wherein the foregoing preparation steps are shown in FIG. 2; and the composite material is compressively molded, cut to a standard testing reflectivity of 300 mm×300 mm×1 mm, and its density is further determined.

Embodiment 2

Surface treatment of hollow glass microbeads: mixing anhydrous ethanol and deionized water that have a mass ratio of 8:0.5 to prepare an ethanol-water mixed solution. Adding glacial acetic acid into the ethanol-water mixed solution to adjust pH to 3 to 4; then adding silane coupling agent A-187 into them to prepare a silane coupling agent solution having a mass fraction of 3%; and further adding the hollow glass microbeads into the silane coupling agent solution to obtain a hollow glass microbeads solution.

Then the hollow glass microbeads solution is heated to 80° C., stirred for 80 minutes, filtered, washed by using deionized water until the solution is neutral, and then dried at 100° C. for 2.5 hours under vacuum circumstance, to obtain surface-treated hollow glass microbeads.

Preparation of epoxy resin wave-absorbing composite material: heating 100 portions of epoxy resin to 70° C., adding 30 portions of carbon black, and then ultrasonically dispersing them for 35 minutes, to obtain a mixture of the epoxy resin and the carbon black. Heating the mixture of the epoxy resin and the carbon black to 100° C., adding 32 portions of curing agent, stirring and dissolving them to obtain a mixture of the epoxy resin, the carbon black, and the curing agent.

Adding 25 portions of surface-treated hollow glass microbeads into the mixture of the epoxy resin, the carbon black, and the curing agent; then ultrasonically dispersing them for 40 minutes, and further degassing them by using a vacuum oven until the mixture has no bubble.

Then the mixture of the epoxy resin, the carbon black, and the curing agent is poured into a mold, dried at 110° C. for 3 hours and cured at 170° C. for 5 hours under vacuum circumstance, to obtain the epoxy resin wave-absorbing composite material. Wherein the composite material is compressively molded, cut to a standard testing reflectivity of 300 mm×300 mm×1 mm, and its density is further determined.

Embodiment 3

Surface treatment of hollow glass microbeads: mixing anhydrous ethanol and deionized water that have a mass ratio of 10:1 to prepare an ethanol-water mixed solution.

Adding glacial acetic acid into the ethanol-water mixed solution to adjust pH to 3 to 4; then adding silane coupling agent A-1100 into them to obtain a silane coupling agent solution having a mass fraction of 2%; and further adding the hollow glass microbeads into the silane coupling agent solution to obtain a hollow glass microbeads solution having a concentration of 3M.

Then the hollow glass microbeads solution is heated to 100° C., stirred for 70 minutes, filtered, washed by using deionized water until the solution is neutral, and then dried at 110° C. for 3 hours under vacuum circumstance, to obtain surface-treated hollow glass microbeads.

Preparation of epoxy resin wave-absorbing composite material: heating 80 portions of epoxy resin to 50° C., adding 25 portions of carbon black, and then ultrasonically dispersing them for 40 minutes, to obtain a mixture of the epoxy resin and the carbon black. Heating the mixture of the epoxy resin and the carbon black to 110° C., adding 30 portions of curing agent, and stirring and dissolving them to obtain a mixture of the epoxy resin, the carbon black, and the curing agent.

Adding 35 portions of surface-treated hollow glass microbeads into the mixture of the epoxy resin, the carbon black, and the curing agent; then ultrasonically dispersing them for 60 minutes, and further degassing them by using a vacuum oven until the mixture has no bubble.

Then the mixture of the epoxy resin, the carbon black, and the curing agent is poured into a mold, dried at 130° C. for 1 hours and cured at 180° C. for 4 hours under vacuum circumstance, to obtain the epoxy resin wave-absorbing composite material. Wherein the composite material is compressively molded, cut to a standard testing reflectivity of 300 mm×300 mm×1 mm, and its density is further determined.

Embodiment 4

Surface treatment of hollow glass microbeads: mixing anhydrous ethanol and deionized water that have a mass ratio of 10:2, to prepare an ethanol-water mixed solution. Adding glacial acetic acid into the ethanol-water mixed solution to adjust pH to 3 to 4; then adding silane coupling agent A-172 into them to obtain a silane coupling agent solution having a mass fraction of 2.5%; and further adding the hollow glass microbeads into the silane coupling agent solution to obtain a hollow glass microbeads solution.

Then the hollow glass microbeads solution is heated to 90° C., stirred for 60 minutes, filtered, washed by using deionized water until the solution is neutral, and then dried at 105° C. for 3 hours under vacuum circumstance, to obtain surface-treated hollow glass microbeads.

Preparation of epoxy resin wave-absorbing composite material: heating 100 portions of epoxy resin to 60° C., adding 20 portions of carbon black, and then ultrasonically dispersing them for 50 minutes, to obtain a mixture of the epoxy resin and the carbon black. Heating the mixture of the epoxy resin and the carbon black to 120° C., adding 32 portions of curing agent, stirring and dissolving them to obtain a mixture of the epoxy resin, the carbon black, and the curing agent.

Adding 30 portions of surface-treated hollow glass microbeads into the mixture of the epoxy resin, the carbon black, and the curing agent, then ultrasonically dispersing them for 30 minutes, and further degassing them by using a vacuum oven until the mixture has no bubble.

Then the mixture of the epoxy resin, the carbon black, and the curing agent is poured into a mold, dried at 120° C. for 3 hours and cured at 190° C. for 3 hours under vacuum circumstance; to obtain the epoxy resin wave-absorbing composite material. Wherein the composite material is compressively molded, cut to a standard testing reflectivity of 300 mm×300 mm×1 mm, and its density is further determined.

Embodiment 5

Surface treatment of hollow glass microbeads: mixing anhydrous ethanol and deionized water that have a mass ratio of 9:2, to prepare an ethanol-water mixed solution. Adding glacial acetic acid into the ethanol-water mixed solution to adjust pH to 3 to 4; then adding silane coupling agent A-1100 into them to obtain a silane coupling agent solution having a mass fraction of 2.5%; and further adding the hollow glass microbeads into the silane coupling agent solution to obtain a hollow glass microbeads solution.

Then the hollow glass microbeads solution is heated to 100° C., stirred for 60 minutes, filtered, washed by using deionized water until the solution is neutral, and then dried at 105° C. for 2 hours under vacuum circumstance, to obtain surface-treated hollow glass microbeads.

Preparation of epoxy resin wave-absorbing composite material: heating 100 portions of epoxy resin to 65° C., adding 30 portions of carbon black, and then ultrasonically dispersing them for 60 minutes, to obtain a mixture of the epoxy resin and the carbon black. Heating the mixture of the epoxy resin and the carbon black to 115° C., adding 32 portions of curing agent, stirring and dissolving them to obtain a mixture of the epoxy resin, the carbon black, and the curing agent.

Adding 25 portions of surface-treated hollow glass microbeads into the mixture of the epoxy resin, the carbon black, and the curing agent; then ultrasonically dispersing them for 35 minutes, and further degassing them by using a vacuum oven until the mixture has no bubble.

Then the mixture of the epoxy resin, the carbon black, and the curing agent is poured into a mold, and dried at 120° C. for 2 hours and cured at 180° C. for 4 hours under vacuum circumstance, to obtain the epoxy resin wave-absorbing composite material. Wherein the composite material is compressively molded, cut to a standard testing reflectivity of 300 mm×300 mm×1 mm, and its density is further determined.

Embodiment 6

Surface treatment of hollow glass microbeads: mixing anhydrous ethanol and deionized water that have a mass ratio of 9:1, to prepare an ethanol-water mixed solution. Adding glacial acetic acid into the ethanol-water mixed solution to adjust pH to 3 to 4; then adding silane coupling agent A-187 into them to obtain a silane coupling agent solution having a mass fraction of 2%; and further adding the hollow glass microbeads into the silane coupling agent solution to obtain a hollow glass microbeads solution.

Then the hollow glass microbeads solution is heated to 80° C., stirred for 75 minutes, filtered, washed by using deionized water until the solution is neutral, and then dried at 100° C. for 3 hours under vacuum circumstance, to obtain surface-treated hollow glass microbeads.

Preparation of epoxy resin wave-absorbing composite material: heating 100 portions of epoxy resin to 60° C., adding 25 portions of carbon black, and then ultrasonically dispersing them for 30 minutes, to obtain a mixture of the epoxy resin and the carbon black. Heating the mixture of the epoxy resin and the carbon black to 110° C., adding 32 portions of curing agent, stirring and dissolving them to obtain a mixture of the epoxy resin, the carbon black, and the curing agent.

Adding 30 portions of surface-treated hollow glass microbeads into the mixture of the epoxy resin, the carbon black, and the curing agent, then ultrasonically dispersing them for 50 minutes, and further degassing them by using a vacuum oven until the mixture has no bubble.

Then the mixture of the epoxy resin, the carbon black, and the curing agent is poured into a mold, dried at 120° C. for 2 hours and cured at 170° C. for 4 hours under vacuum circumstance, to obtain the epoxy resin wave-absorbing composite material. Wherein the composite material is compressively molded, cut to a standard testing reflectivity of 300 mm×300 mm×1 mm, and its density is further determined.

The above stirring speed is 800 to 900 r/min.

The above densities are tested according to GB/T 6343-2009, and the above reflectivities are all tested by using an SFL-I reflectivity meter.

Reflectivity and density results obtained in the tests of Embodiment 1 to Embodiment 6 are shown in Table 1.

TABLE 1

| | | Test results | | | | | |
|---|---|---|---|---|---|---|---|
| | | Embodiment | | | | | |
| | | 1 | 2 | 3 | 4 | 5 | 6 |
| Reflectivity (−dB) | 0.5 to 2 GHz | 6.0 | 5.7 | 5.0 | 5.7 | 5.3 | 6.4 |
| | 4 to 8 GHz | 9.2 | 8.3 | 7.9 | 10.0 | 10.8 | 10.7 |
| | 8 to 12 GHz | 10.5 | 11.6 | 11 | 18.2 | 19.3 | 19.7 |
| | 12 to 18 GHz | 24.7 | 20.5 | 26.0 | 25.2 | 28.5 | 32.7 |
| Density (g/cm³) | | 0.88 | 0.89 | 0.92 | 0.95 | 0.93 | 0.85 |

As seen from Table 1, in the present disclosure, the hollow glass microbeads are processed by using the ethanol-water mixed solution to obtain the surface-treated hollow glass microbeads having relatively good wave-absorbing performance, and the surface-treated hollow glass microbeads and the carbon black are used as the wave-absorbing agent to prepare the epoxy resin wave-absorbing composite material, wherein the reflectivity of the epoxy resin wave-absorbing composite material is less than −5 dB in the wave-absorption frequency range of 0.5 to 18 GHz, a minimum value of the reflectivity is −32.7 dB; which effectively enhances the wave-absorbing performance of the epoxy resin wave-absorbing composite material. In addition, the surface-treated hollow glass microbeads are thoroughly mixed with the mixture of the epoxy resin, the carbon black, and the curing agent by ultrasonically dispersing, degassing under vacuum circumstance, and then curing under vacuum circumstance. Such that the prepared epoxy resin wave-absorbing composite material broadens the wave-absorbing band of the composite material. At the same time, the combination of the surface-treated hollow glass microbeads and the mixture of the epoxy resin, the carbon black, and the curing agent effectively reduces the density of the composite material, such that the density of the composite material is as low as 0.85 g/cm3, which satisfies the requirements of thin, light, wide, and strong for the wave-absorbing composite material.

A person skilled in the art should understand that the foregoing embodiments are merely example embodiments, and various variations, replacements, and changes can be made without departing from the spirit and the scope of the present disclosure.

What is claimed is:

1. A preparation method of an epoxy resin wave-absorbing composite material, comprising:
heating an epoxy resin to temperature T1 and adding carbon black to obtain a mixture of the epoxy resin and the carbon black;
heating the mixture of the epoxy resin and the carbon black to temperature T2, adding a curing agent, and stirring and dissolving them to obtain a mixture of the epoxy resin, the carbon black, and the curing agent; and
adding surface-treated hollow glass microbeads into the mixture of the epoxy resin, the carbon black, and the curing agent, and curing them to obtain the epoxy resin wave-absorbing composite material.

2. The preparation method according to claim 1, wherein the preparation method further comprises: adding glacial acetic acid into an ethanol-water mixed solution to adjust pH, then adding a silane coupling agent into them to obtain a silane coupling agent solution; and further adding hollow glass microbeads into the silane coupling agent solution to obtain a hollow glass microbeads solution; heating the hollow glass microbeads solution to 80° C. to 100° C., stirring, filtering, washing, and then drying the hollow glass microbeads solution under vacuum circumstance to obtain the surface-treated hollow glass microbeads.

3. The preparation method according to claim 2, wherein the ethanol-water mixed solution is prepared by mixing anhydrous ethanol and deionized water that have a mass ratio of 8 to 10:0.5 to 2.

4. The preparation method according to claim 2, wherein the pH of the ethanol-water mixed solution obtained after the pH adjustment is 3 to 4.

5. The preparation method according to claim 2, wherein the silane coupling agent is one or more of γ-aminopropyl triethoxysilane, (2,3-glycidoxy)propyltrimethoxysilane, and vinyl tris(β-methoxyethoxy) silane.

6. The preparation method according to claim 2, wherein a mass fraction of the silane coupling agent in the silane coupling agent solution is 2% to 3%.

7. The preparation method according to claim 2, wherein the drying temperature under vacuum circumstance is 100° C. to 110° C., and the drying time under vacuum circumstance is 2 to 3 hours.

8. The preparation method according to claim 2, wherein the step of washing the hollow glass microbeads solution comprises:
washing the hollow glass microbeads solution by using deionized water until a pH of the hollow glass microbeads solution is neutral.

9. The preparation method according to claim 1, wherein a mass ratio of the epoxy resin, the carbon black, the curing agent, and the surface-treated hollow glass microbeads is 80 to 120:20 to 30:30 to 34:25 to 35.

10. The preparation method according to claim 9, wherein the mass ratio of the epoxy resin, the carbon black, the curing agent, and the surface-treated hollow glass microbeads is 100:25:32:30.

11. The preparation method according to claim 1, wherein T1 is 50° C. to 70° C., and T2 is 100° C. to 120° C.

12. The preparation method according to claim 1, wherein the preparation method further comprises: adding the surface-treated hollow glass microbeads into the mixture of the epoxy resin, the carbon black, and the curing agent; ultrasonically dispersing them, then degassing them under vacuum circumstance, for curing them, to obtain the epoxy resin wave-absorbing composite material.

13. The preparation method according to claim 12, wherein the step of degassing them under vacuum circumstance comprises:
degassing them by using a vacuum oven or a vacuum degasser until the mixture of the epoxy resin, the carbon black, and the curing agent has no bubble.

14. The preparation method according to claim 1, wherein the step of curing them comprises:
drying them at 110° C. to 130° C. for 1 to 3 hours and curing them at 170° C. to 190° C. for 3 to 5 hours under vacuum circumstance.

* * * * *